(12) United States Patent
Kumar et al.

(10) Patent No.: US 8,603,659 B2
(45) Date of Patent: Dec. 10, 2013

(54) SEALING GLASS COMPOSITION AND ARTICLE

(75) Inventors: Sundeep Kumar, Karnataka (IN); Mamatha Nagesh, Karnataka (IN); Digamber Porob, Goa (IN); Vinayak Hassan Vishwanath, Karnataka (IN)

(73) Assignee: General Electric Company, Schenectady, NY (US)

( * ) Notice: Subject to any disclaimer, the term of this patent is extended or adjusted under 35 U.S.C. 154(b) by 1132 days.

(21) Appl. No.: 12/245,428

(22) Filed: Oct. 3, 2008

(65) Prior Publication Data

US 2010/0086846 A1 Apr. 8, 2010

(51) Int. Cl.
*H01M 10/50* (2006.01)

(52) U.S. Cl.
USPC .............................. 429/120; 428/209; 501/15

(58) Field of Classification Search
USPC ....................................................... 429/120
See application file for complete search history.

(56) References Cited

U.S. PATENT DOCUMENTS

| | | | |
|---|---|---|---|
| 3,928,071 A | 12/1975 | Thornton | |
| 3,932,195 A * | 1/1976 | Evans et al. | 429/104 |
| 3,959,011 A | 5/1976 | Thornton | |
| 3,959,020 A | 5/1976 | Will et al. | |
| 4,239,838 A | 12/1980 | Miller et al. | |
| 4,268,313 A * | 5/1981 | Park et al. | 501/15 |
| 4,294,897 A | 10/1981 | Bindin | |
| 5,112,777 A | 5/1992 | McDowell | |
| 5,134,044 A | 7/1992 | Megerle | |
| 5,158,840 A | 10/1992 | Megerle | |
| 5,194,337 A | 3/1993 | Yoshida et al. | |
| 5,196,277 A | 3/1993 | Mima et al. | |
| 5,270,135 A | 12/1993 | O'Neil-Bell et al. | |
| 5,750,279 A | 5/1998 | Carolan et al. | |
| 6,207,321 B1 | 3/2001 | Fukagawa et al. | |
| 6,902,798 B2 | 6/2005 | Ghosh et al. | |
| 7,060,117 B2 | 6/2006 | Ogura et al. | |
| 7,101,819 B2 | 9/2006 | Rosenflanz et al. | |
| 7,147,544 B2 | 12/2006 | Rosenflanz | |
| 7,192,898 B2 | 3/2007 | Mori et al. | |
| 7,291,571 B2 | 11/2007 | Sprenger | |
| 7,332,453 B2 | 2/2008 | Rosenflanz et al. | |
| 2003/0158030 A1 | 8/2003 | Yamamoto et al. | |
| 2005/0147866 A1 * | 7/2005 | Ko et al. | 429/36 |
| 2006/0019813 A1 * | 1/2006 | Yoshii | 501/15 |
| 2006/0128551 A1 * | 6/2006 | Esmaeilzadeh | 501/55 |

FOREIGN PATENT DOCUMENTS

WO 2007078898 A1 7/2007

OTHER PUBLICATIONS

Optical properties of new borolanthanum oxide-fluoride glasses, Fizika i Khimiya Stekla, Galant, V.E., Nosyreva, E.B., 18 (5), pp. 98-101, 1992, Abstract.

Proceedings of the 1st European Fuel Cell Technology and Applications Conference 2005, Glass-ceramic sealants for solid oxide fuel cells, Sanson, Alessandra (CNR-ISTEC); Piancastelli, Andreana; Roncari, Edoardo Abstract.

* cited by examiner

*Primary Examiner* — Barbara Gilliam
*Assistant Examiner* — Gary Harris
(74) *Attorney, Agent, or Firm* — GE Global Patent Operation; Catherine J. Winter

(57) ABSTRACT

A sealing glass composition includes from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide. Methods for preparing the sealing glass and a sodium battery cell are also provided.

31 Claims, 4 Drawing Sheets

SEALING GLASS COMPOSITION AND ARTICLE

TECHNICAL FIELD

This invention includes embodiments that relate to a sealing glass. The invention includes embodiments that relate to an article made using the sealing glass.

BACKGROUND

Sealing glasses may be used in sodium/sulfur or sodium/metal halide batteries to seal ceramic components together. The components can include an electrically insulating alpha-alumina collar and an ion-conductive electrolyte beta-alumina tube. The sealing glass should join ceramic components and maintain the seal by having a proper wetting behavior, a similar thermal expansion property and a good strength, among many requirements. During sealing, ionic interdiffusion between the glass and the ceramic components can occur leading to undesirable effects, such as cell resistance increase and devitrification of the glass, which can cause a change in the thermal expansion property of the sealing glass and contribute to seal failure.

Commercial sealing glasses may not meet the complex set of requirements necessary in a sodium battery operated at 300 to 400 degrees Celsius for an extended period of time, which can be for as long as 20 years. Commercial glasses may be subject to chemical corrosion. The sealing glass should withstand high temperatures and corrosive environments. During operation of the battery, the sealing glass may contact molten or gaseous sodium or metal halide, which can corrode the glass and break down the seal. These sealing glasses may not resist sodium and halide exposure at operating temperatures and may corrode.

It may be desirable to have a sealing glass composition that has properties and characteristics that differ from those materials that are currently available.

BRIEF DESCRIPTION

In one embodiment, a sealing glass composition includes from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide.

In another embodiment, a method for making a sealing glass composition includes blending from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide.

In another embodiment, a sodium battery cell incorporates a sealing glass that is the reaction product of from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide.

Various embodiments may provide sealing glasses that are able to withstand corrosive environments. The sealing glasses may increase the lifetime of the battery. The sealing glasses may have good sodium and halide resistance at operating temperatures, as well as complimentary mechanical properties, stability at high temperatures, and thermal expansion properties relative to ceramic components.

DETAILED DESCRIPTION

Figure 1:
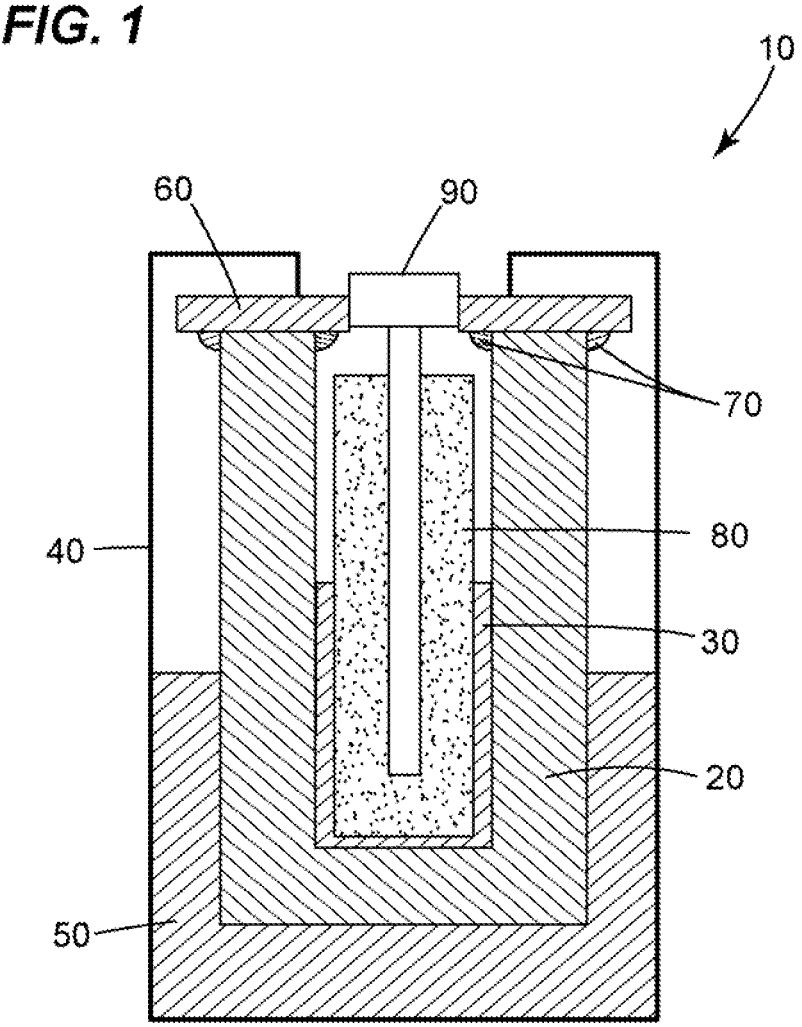
FIG. 1 is a schematic diagram depicting an exemplary embodiment of a sodium-metal halide battery cell.

This invention includes embodiments that relate to a sealing glass composition. The invention includes embodiments that relate to an article made using the sealing glass composition. The sealing glass composition can include oxides of barium, aluminum, yttrium and boron in determined amounts. The sealing glass may optionally include strontium oxide.

As used herein, sealing glass refers to a composition that can seal and is glassy. Seal is a function performed by a structure that helps join other structures together to reduce or prevent leakage through the joint of the other structures. Glassy refers to a vitreous solid or an inorganic product of fusion that has been cooled to a rigid condition without some or any crystallizing (i.e., is amorphous to some determined extent).

In one embodiment, a sealing glass composition includes from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide. Each of the components of a sealing glass contributes to multiple properties in the sealing glass, such as thermal expansion, working point, glass transition temperature and corrosion resistance.

Barium oxide may be present in an amount that is equal to or greater than about 10 molar percent. Barium oxide may be present in an amount that is less than or equal to about 30 molar percent. In one embodiment, barium oxide is present from about 10 molar percent to about 30 molar percent. In one embodiment, barium oxide is present from about 15 molar percent to about 30 molar percent. In another embodiment, barium oxide is present from about 15 molar percent to about 25 molar percent. In another embodiment, barium oxide is present from about 15 molar percent to about 20 molar percent. In another embodiment, barium oxide is present from about 20 molar percent to about 25 molar percent. In another embodiment, barium oxide is present from about 25 molar percent to about 30 molar percent.

Aluminum oxide may be present in an amount that is greater than or equal to about 15 molar percent. Aluminum oxide may be present in an amount that is less than or equal to about 30 molar percent. In one embodiment, aluminum oxide is present from about 15 molar percent to about 30 molar percent. In one embodiment, aluminum oxide is present from about 15 molar percent to about 25 molar percent. In another embodiment, aluminum oxide is present from about 15 molar percent to about 20 molar percent. In another embodiment, aluminum oxide is present from about 20 molar percent to about 25 molar percent.

Boron oxide may be present in an amount that is greater than or equal to about 40 molar percent. Boron may be present in an amount that is less than or equal to about 60 molar percent. In one embodiment, boron oxide is present from about 40 molar percent to about 60 molar percent. In one embodiment, boron oxide is present from about 45 molar percent to about 55 molar percent.

Yttrium oxide may be present from about 1 molar percent to about 20 molar percent. In another embodiment, yttrium oxide is present from about 1 molar percent to about 15 molar percent. In another embodiment, the yttrium oxide is present from about 5 molar percent to about 15 molar percent. In one embodiment, yttrium oxide is present from about 1 molar percent to about 5 molar percent. In another embodiment, yttrium oxide is present from about 15 molar percent to about 20 molar percent.

The sealing glass may optionally include other alkali earth oxides, such as strontium oxide. In one embodiment, the sealing glass includes up to about 10 molar percent strontium oxide. In another embodiment, the sealing glass includes up to about 8 molar percent strontium oxide.

The sealing glass has a thermal expansion compatible with the ceramic components in the sulfur/sodium or sodium/metal halide battery. In one embodiment, the sealing glass composition has a coefficient of thermal expansion at 20 degrees Celsius to 350 degrees Celsius of from about 6.0 ppm/° C. to about 8.0 ppm/° C. In another embodiment, the sealing glass composition has a coefficient of thermal expansion from about 6.0 ppm/° C. to about 7.5 ppm/° C.

The sealing glass stability and chemical resistance may be within determined parameters at a determined operating temperature. In one embodiment, the sealing glass has a glass transition temperature of at least about 600 degrees Celsius. In another embodiment, the glass transition temperature is in a range of from about 600 degrees Celsius to about 700 degrees Celsius. In another embodiment, the glass transition temperature is in a range of from about 600 degrees Celsius to about 680 degrees Celsius.

The sealing glass has good corrosion resistance against molten sodium and halide. The sodium and/or halide may be molten or gaseous. The sealing glass may have a micro Vicker hardness of at least about 4.5 gigapascal (GPa). In another embodiment, the sealing glass has a micro Vicker hardness in the range of from about 4.5 GPa to about 6 GPa.

A method for making the sealing glass composition may include blending barium oxide, aluminum oxide, boron oxide and yttrium oxide (or precursors thereof) and melting the oxides to form a composition having from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide.

The barium oxide, aluminum oxide, yttrium oxide and boron oxide may be mixed and melted to form the sealing glass composition. The ranges for the oxides are described above.

In one embodiment, the oxides are melt-blended to form the sealing glass composition. In one embodiment, the oxides are melted at a temperature in a range from about 1200 degrees Celsius to about 1500 degrees Celsius. The molten glass is cooled to prepare a homogenous sealing glass composition. In one embodiment, the molten glass is cooled at room temperature. In another embodiment, the molten glass composition is quenched between stainless steel plates at room temperature.

In another embodiment, the molten glass composition may be poured into a mold to form a desired shape, such as a block, and cooled to room temperature to provide a molded sealing glass. In one embodiment, the materials are pre-mixed as powders and are formed into a seal structure, in situ, in contact with the components to be sealed.

In another embodiment, an energy storage device includes an electrochemical cell that incorporates a sealing glass. The energy storage device may be a sodium battery, and in one embodiment, may be a metal halide battery. Two exemplary metal halide batteries suitable for use include a nickel sodium chloride battery and a zinc-zinc chloride battery. In one embodiment, the sealing glass is a reaction product of from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide. Additional ranges for the oxides in the sealing glass are described above.

In one embodiment, sodium-sulfur or sodium/metal halide batteries may contain a sealing glass in a ceramic-to-ceramic seal structure that secures an electrically insulating collar and an ion-conductive electrolyte tube.

The ceramic collar can fit onto the ion-conductive electrolyte tube and is sealed with the sealing glass. In one embodiment, the collar is positioned around and adjacent to an open end of the electrolyte tube. In another embodiment, the collar has a lower inner portion that abuts against the outer wall of the tube and has an upper portion that is recessed. The collar and tube may be temporarily held together with an assembly until it is sealed.

The solid electrolyte tube includes ion-conductive materials, such as beta-alumina. The collar includes electrically insulating materials, such as alpha-alumina.

The sealing glass may be applied to the collar and the solid electrolyte tube to seal the ceramic components together. In one embodiment, the sealing glass is ground into small particle sizes. In one embodiment, the glass particles of the sealing glass are positioned in the recess between the outer surface of the tube and the upper portion of the adjacent collar. The sealing glass particles are heated to a temperature of about 1100° C. in an air atmosphere to melt the glass particles. The assembly is then cooled to room temperature with a resulting sealing glass sealing the collar to the outer wall of the tube.

FIG. 1 is a schematic diagram depicting an exemplary embodiment of a sodium-metal halide battery cell 10. The sodium-halide battery cell 10 has an ion-conductive electrolyte tube 20, which may be a β-alumina, a negative electrode chamber 30, a cell case 40 filled with sodium 50 arranged at the outside of the electrolyte tube 20, a negative electrode terminal tube 90 and an insulative ceramic collar 60, which may be made of an α-alumina. The negative electrode chamber 30 contains a halide, which is arranged at the inside of the electrolyte tube 20, and a cathode 80. The ceramic collar 60 is joined to the upper end of the outer circumferential surface of the electrolyte tube 20 by means of a sealing glass 70, which is described above.

EXAMPLES

The following examples illustrate methods and embodiments in accordance with the invention, and do not limit the claims. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

Four sealing glass samples (a comparative example CE-1 and samples 2-4) are prepared by mixing thoroughly, by grinding, barium oxide (97%, Sigma-Aldrich), aluminum oxide (99.99% Inframat), boron oxide (99%, Sigma-Aldrich) and yttrium oxide (99.99%, Alfa Aesar), in the amounts shown in Table 1. The ground mixture is placed in a crucible and melted in a glass-melting furnace at a temperature of 1500 degrees Celsius for 30 minutes in an air atmosphere to provide molten glass. The molten glass is quenched between two stainless steel plates in air at room temperature to form a mass.

Glass transition temperatures of the glasses are measured using a combined Differential Thermal Analysis/Thermo Gravimetric Analysis (DTA/TGA) Setsys 16/18 (France) and are listed in Table 1. The glasses are annealed below their glass transition temperatures for 10 hours. The amorphous nature of the glass samples is confirmed using X-ray diffraction (CuKa; PANalytical, Netherlands).

Coefficient of thermal expansion is measured for each glass sample using a dilatometer (DIL 402C, Netzsch, Germany) between room temperature and 600° C. Sapphire is used as the calibration standard. Results are shown in Table 1.

Hardness of the glasses is measured using a microhardness tester (Sun-Tec Corporation). Two samples are taken from each glass composition and six measurements are made on each sample to get a statistical average. Results are shown in Table 1.

TABLE 1

| Sample | BaO (mol %) | $Al_2O_3$ (mol %) | $B_2O_3$ (mol %) | $Y_2O_3$ (mol %) | $T_g$ (° C.) | CTE (ppm/° C.)* |
|---|---|---|---|---|---|---|
| CE-1 | 22 | 23 | 55 | 0 | 593 | 5.63 |
| 2 | 20 | 20 | 55 | 5 | 627 | 6.15 |
| 3 | 20 | 20 | 50 | 10 | 643 | 6.69 |
| 4 | 20 | 20 | 45 | 15 | 676 | 7.11 |

*CTE is reported between 20° C. and 350° C.

Figure 2:
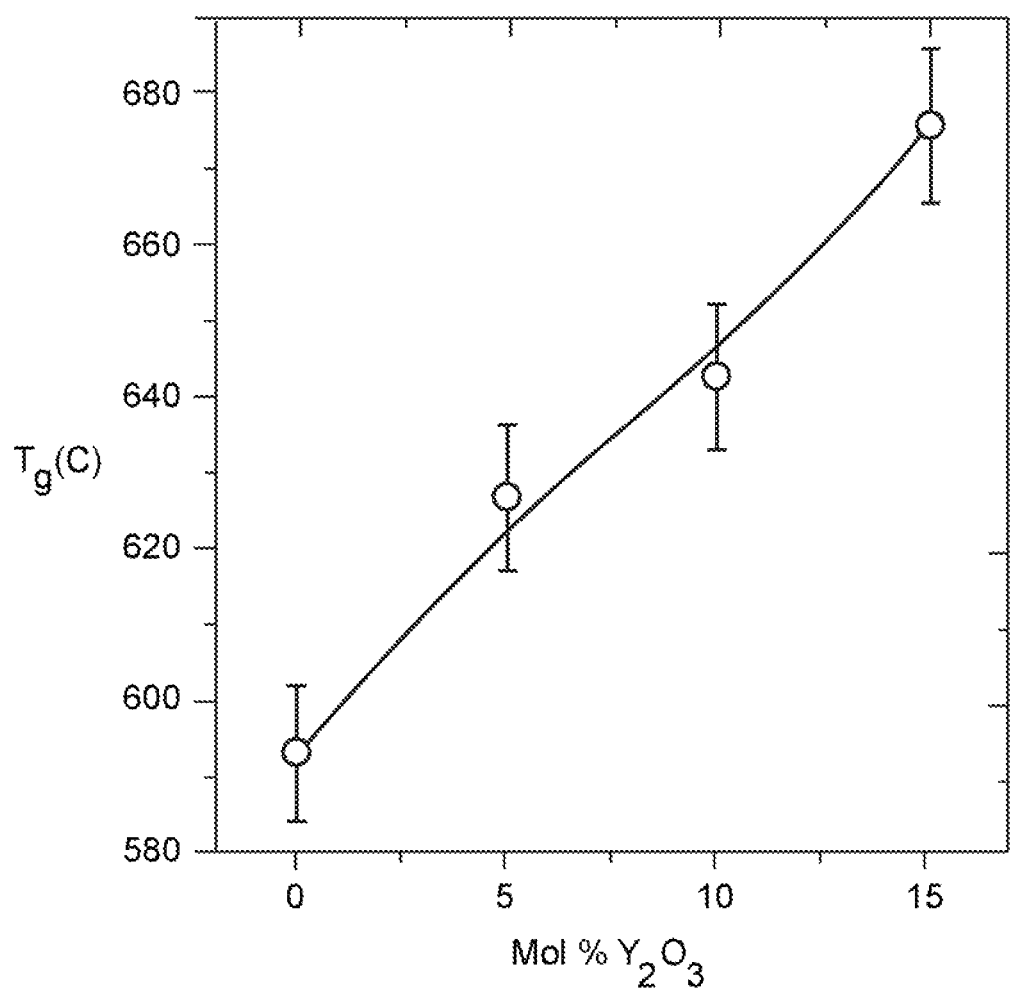
FIG. 2 is a graph showing the variation of glass transition temperature (Tg) as a function of $Y_2O_3$ content in the glass. The graph is Tg (° C.) versus content of $Y_2O_3$ (mol %).
Figure 3:
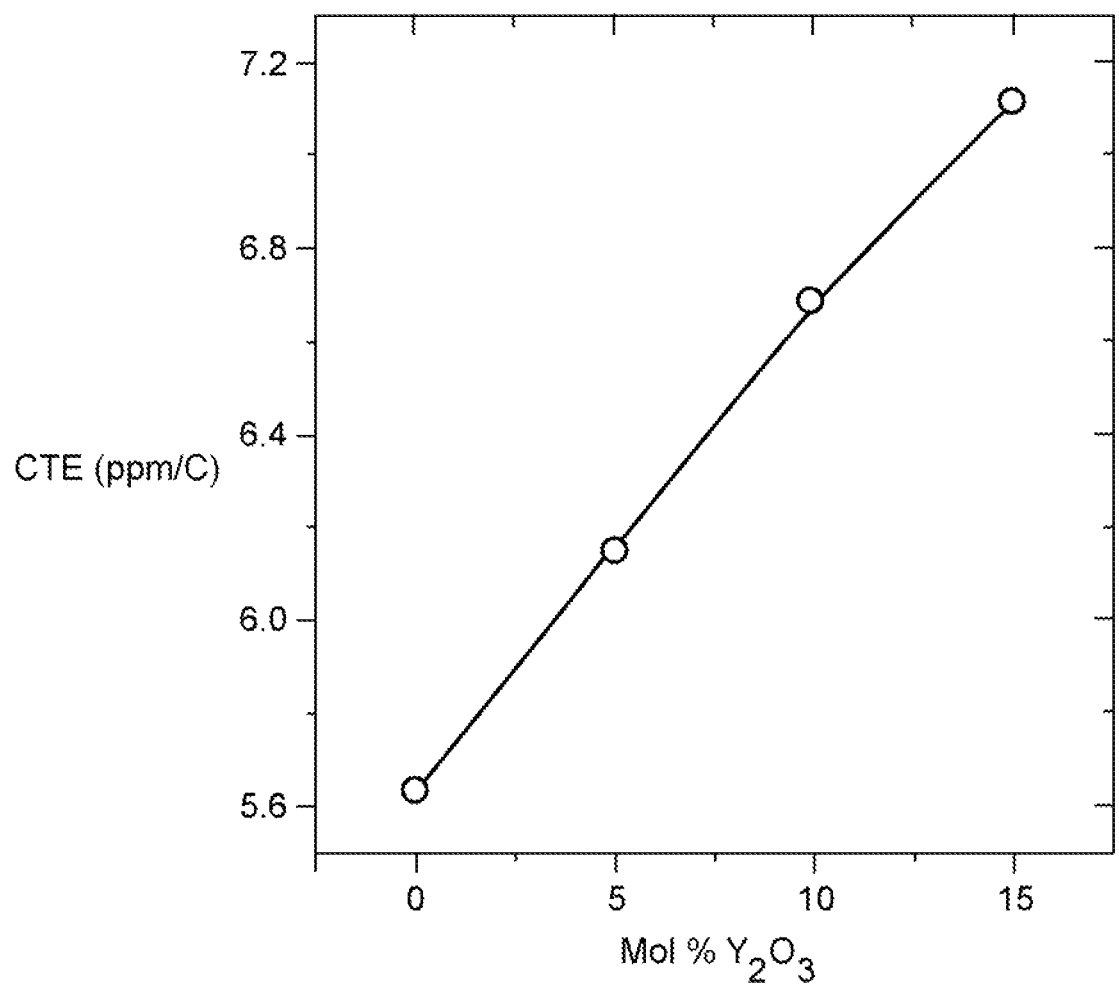
FIG. 3 is a graph showing the variation of the coefficient of thermal expansion (CTE) (between 20 and 350° C.) as a function of $Y_2O_3$ content in the glass. The graph is CTE (ppm/° C.) versus content of $Y_2O_3$ (mol %).
Figure 4:
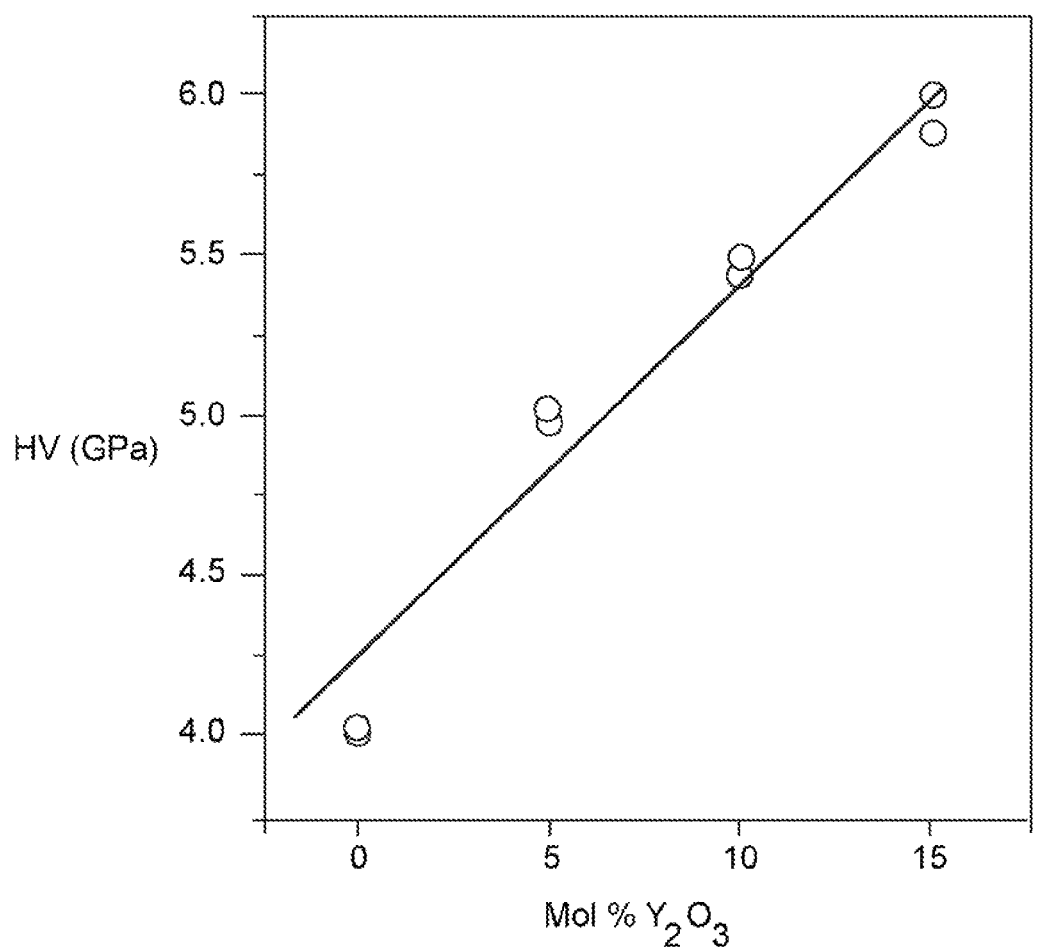
FIG. 4 is a graph showing the variation of micro Viker hardness as a function of $Y_2O_3$ content in the glass. The graph is micro Viker hardness (GPa) versus content of $Y_2O_3$ (mol %).

FIG. 2 is a graph showing the variation of Tg as a function of $Y_2O_3$ content in the seal glass compositions for CE-1 and samples 2-4. FIG. 3 is a graph showing the variation of CTE (between 20 and 350 degrees Celsius) as a function of $Y_2O_3$ content in the seal glass compositions for CE-1 and samples 2-4 and FIG. 4 is a graph showing the variation of micro Vicker hardness as a function of $Y_2O_3$ content in the seal glass compositions for CE-1 and samples 2-4.

Samples 2-4 have higher glass transition temperatures than the comparative example 1 (CE-1), which shows improved structural rigidity. Samples 2-4 have increased hardness compared with comparative example 1.

Example 2

Sample 4 is tested for resistance towards molten sodium at 300° C. for 48 hours. A capsule is designed using Swagelok® parts made of stainless steel, SS316, with VCR® fittings. To ensure a leak proof capsule, a gasket made of stainless steel, SS316L, is used. The capsule is loaded inside a nitrogen-filled glove box (moisture <0.1 ppm and oxygen <0.1 ppm). Two sample 4 seal glass pieces are loaded inside one capsule with two sodium cubes (99.99%, Sigma-Aldrich). The glass pieces are completely immersed in the molten sodium during testing.

Sample 4 had no apparent color change indicating good resistance towards sodium corrosion. The glass exhibited a weight loss of ~0.008% (~$0.007 \times 10^{-4}$ g/cm$^2$) after the corrosion test, which further indicates that the glass is resistant towards sodium corrosion.

Example 3

Sample 4 is tested for resistance towards halide melt at 300° C. for 48 hours. A capsule is designed using Swagelok® parts made of stainless steel, SS304, with compression fitting. An alumina lining is used to contain the halide powder. The composition of the halide melt is $NaAlCl_4$ and loading of the capsule is done inside a nitrogen-filled glove box (moisture <0.1 ppm and oxygen <0.1 ppm). A sample 4 seal glass piece is loaded inside the capsule. The glass piece is completely immersed in the molten halide during testing.

The glass showed a weight loss of about 0.051% (about $0.60 \times 10^{-4}$) after the test, indicating that the glass has good resistance towards halide.

The singular forms "a," "an" and "the" include plural referents unless the context clearly dictates otherwise. The endpoints of all ranges reciting the same characteristic are independently combinable and inclusive of the recited endpoint. All references are incorporated herein by reference. The modifier "about" used in connection with a quantity is inclusive of the stated value and has the meaning dictated by the context (e.g., includes the tolerance ranges associated with measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Preliminary and/or transitional chemical changes, transformations, or reactions, if any, that take place in the resulting mixture, solution, or reaction medium may be identified as intermediate species and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The embodiments described herein are examples of compositions, articles, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, articles, and methods that do not differ from the literal language of the claims, and further includes other compositions, articles, and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A sealing glass composition, comprising:
    from about 10 molar percent to about 30 molar percent barium oxide,
    from about 15 molar percent to about 30 molar percent aluminum oxide,
    from about 40 molar percent to about 60 molar percent boron oxide, and
    from about 1 molar percent to about 20 molar percent yttrium oxide.

2. The sealing glass composition of claim 1 wherein barium oxide is present in an amount that is from about 15 molar percent to about 30 molar percent.

3. The sealing glass composition of claim 1 wherein aluminum oxide is present from about 15 molar percent to about 25 molar percent.

4. The sealing glass composition of claim 1 wherein boron oxide is present from about 45 molar percent to about 55 molar percent.

5. The sealing glass composition of claim 1 wherein yttrium oxide is present from about 1 molar percent to about 15 molar percent.

6. The sealing glass composition of claim 1 wherein the sealing glass has a coefficient of thermal expansion at 20 degrees Celsius to 350 degrees Celsius from about 6.0 ppm/° C. to about 8.0 ppm/° C.

7. The sealing glass composition of claim 1 wherein the sealing glass has a glass transition temperature of at least about 600 degrees Celsius.

8. The sealing glass composition of claim 7 wherein the glass transition temperature is from about 600 degrees Celsius to about 700 degrees Celsius.

9. The sealing glass composition of claim 1 wherein the sealing glass has a micro Vicker hardness of at least about 4.5 gigapascal.

10. The sealing glass composition of claim 9 wherein the sealing glass has a micro Vicker hardness in the range of front about 4.5 gigapascal to about 6 gigapascal.

11. A method comprising:
    blending from about 10 molar percent to about 30 molar percent barium oxide, from about 15 molar percent to about 30 molar percent aluminum oxide, from about 40 molar percent to about 60 molar percent boron oxide and from about 1 molar percent to about 20 molar percent yttrium oxide, wherein the sealing glass is resistant to sodium corrosion; and
    forming a glass seal from the blend to join a first battery component to a second battery component.

12. The method of claim 11 wherein barium oxide is present in an amount from about 15 molar percent to about 30 molar percent.

13. The method of claim 11 wherein aluminum oxide is present from about 15 molar percent to about 25 molar percent.

14. The method of claim 11 wherein boron oxide is present from about 45 molar percent to about 55 molar percent.

15. The method of claim 11 wherein yttrium oxide is present from about 1 molar percent to about 15 molar percent.

16. The method of claim 11 wherein the oxides are melt-blended to form the sealing glass composition.

17. The method of claim 16 wherein the oxides are melted at a temperature in a range from about 1200 degrees Celsius to about 1500 degrees Celsius.

18. An energy storage device comprising:
    an electrochemical cell incorporating a sealing glass that is the reaction product of from about 10 molar percent to about 30 molar percent barium oxide, from about 15 molar percent to about 30 molar percent aluminum oxide, from about 40 molar percent to about 60 molar percent boron oxide and from about 1 molar percent to about 2.0 molar percent yttrium oxide, wherein the sealing glass is resistant to sodium corrosion.

19. The energy storage device of claim 18 wherein barium oxide is present in an amount from about 15 molar percent about 30 molar percent.

20. The energy storage device of claim 18 wherein aluminum oxide is present from about 15 molar percent to about 25 molar percent.

21. The energy storage device of claim 18 wherein boron oxide is present from about 45 molar percent to about 55 molar percent.

22. The energy storage device of claim 18 wherein yttrium oxide is present from about 1 molar percent to about 15 molar percent.

23. The energy storage device of claim 18 wherein the sealing glass has a coefficient of thermal expansion at 20 degrees Celsius to 350 degrees Celsius of from about 6.0 ppm/° C. to about 8.0 ppm/° C.

24. The energy storage device of claim 18 wherein the sealing glass has a glass transition temperature of at least 600 degrees Celsius.

25. The energy storage device of claim 18 wherein the glass transition temperature is from about 600 degrees Celsius to about 700 degrees Celsius.

26. The energy storage device of claim 18 wherein the sealing glass has a micro Vicker hardness of at least 4.5 gigapascal.

27. The energy storage device of claim 18 wherein the sealing glass has a micro Vicker hardness in the range of from about 4.5 gigapascal to about 6 gigapascal.

28. The energy storage device of claim 18 wherein the electrochemical cell contains a first battery component and a second battery component.

29. The energy storage device of claim 28 wherein the first battery component is an electrically insulating collar and the second battery component is an ion-conductive electrolyte tube.

30. The energy storage device of claim 29 wherein the sealing glass seals the electrically insulating collar and the ion-conductive electrolyte tube.

31. The energy storage device of claim 30 wherein the collar comprises alpha-alumina and the electrolyte tube comprises beta-alumina.

* * * * *